Oct. 5, 1954  A. E. BROWN  2,690,869
ROTARY MECHANISM FOR USE WITH FLUIDS
Filed Sept. 2, 1950  2 Sheets-Sheet 1
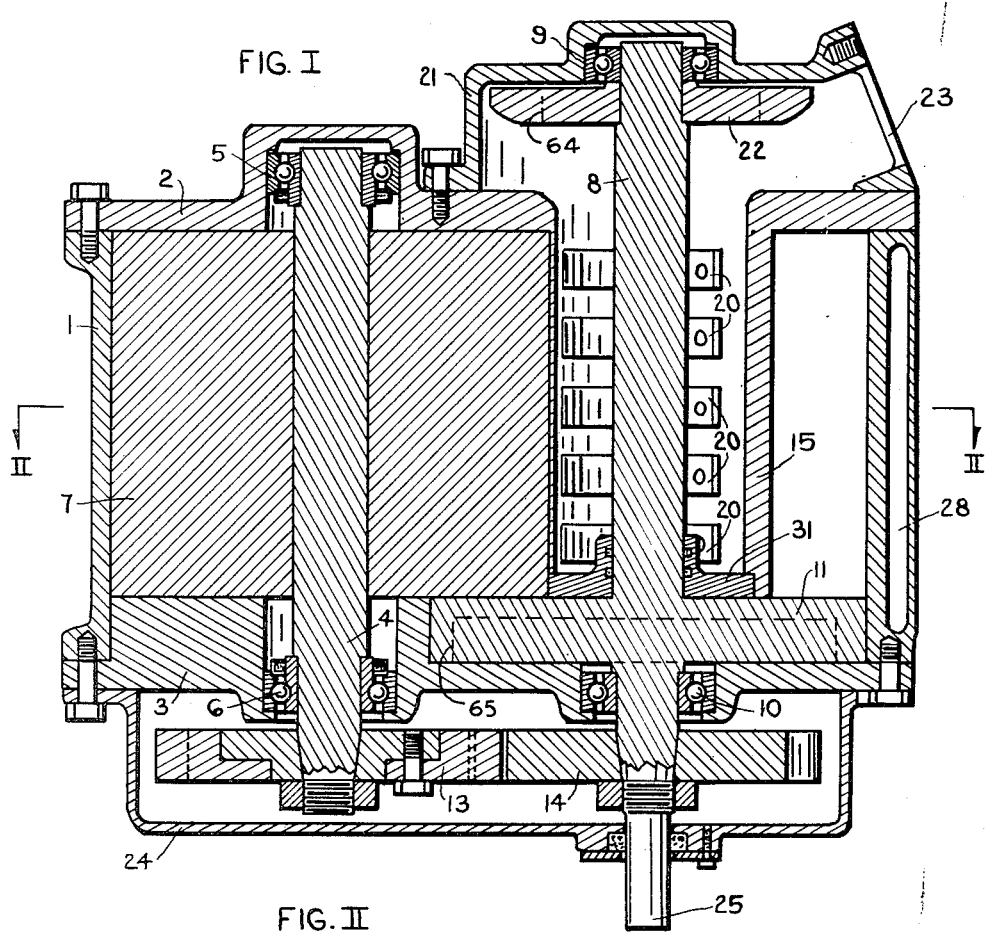
FIG. I
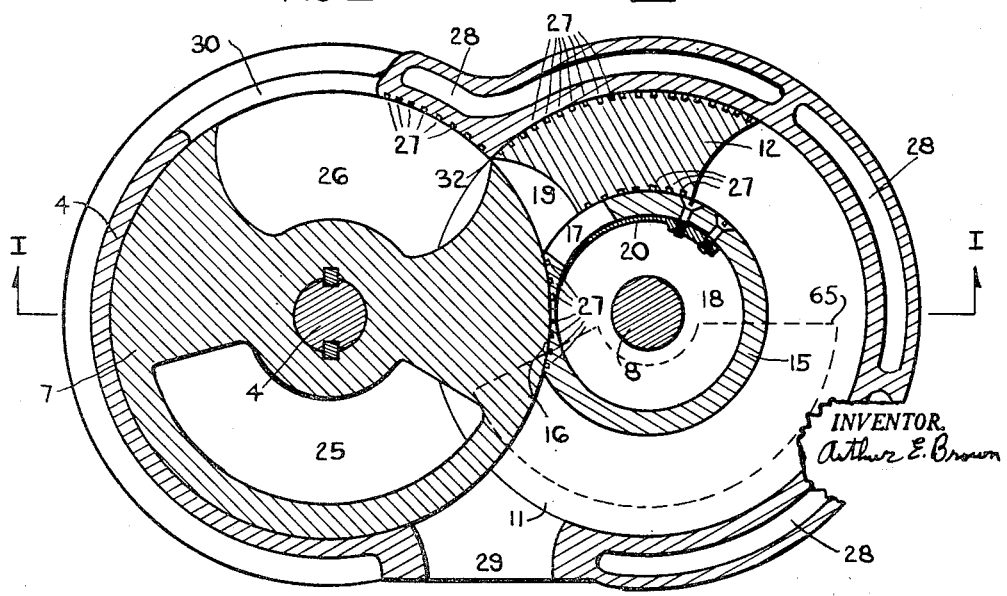
FIG. II
INVENTOR.
Arthur E. Brown Oct. 5, 1954         A. E. BROWN         2,690,869
ROTARY MECHANISM FOR USE WITH FLUIDS
Filed Sept. 2, 1950                 2 Sheets-Sheet 2
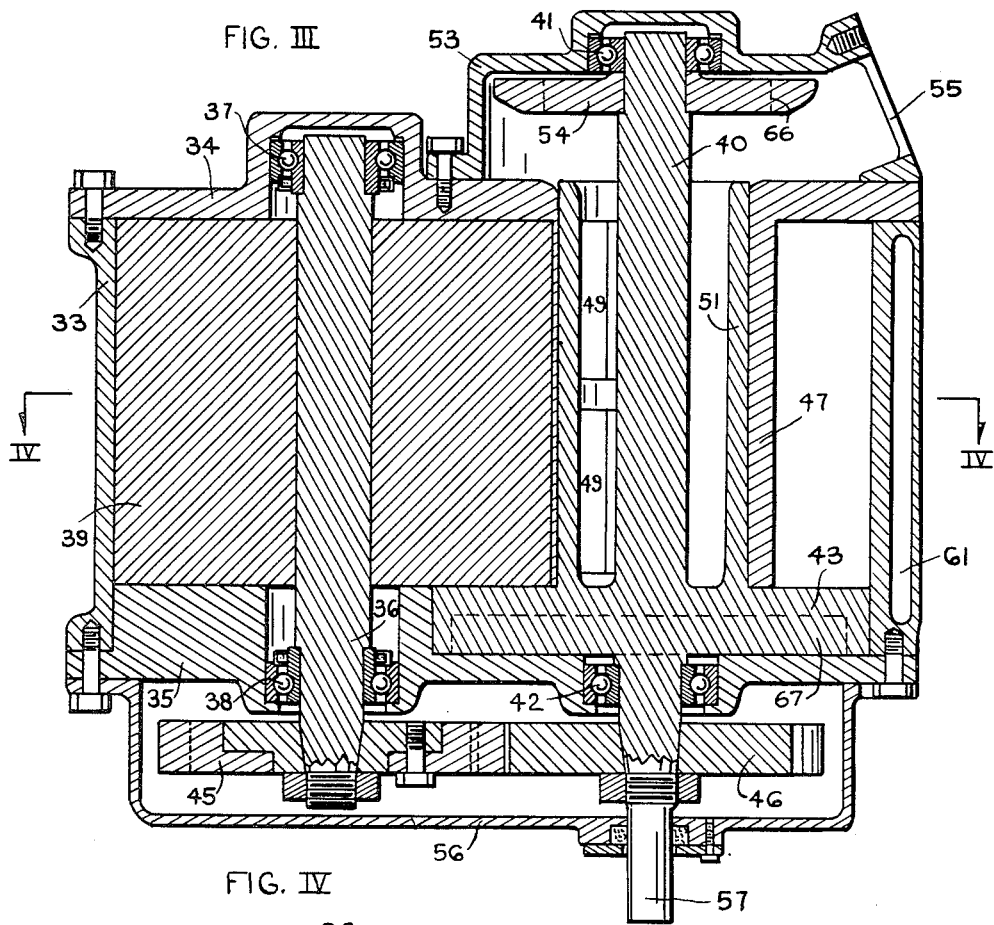
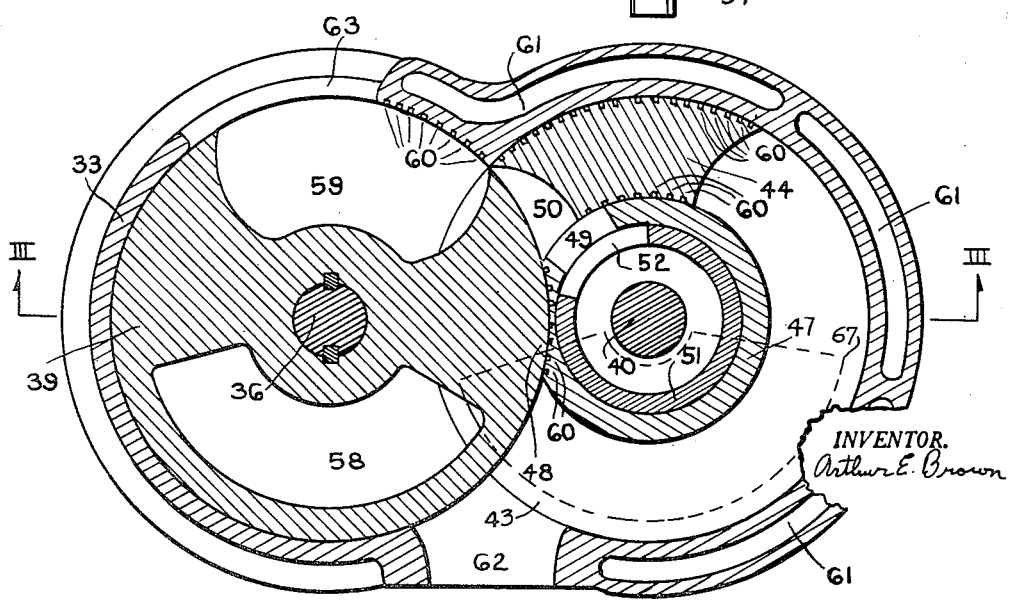
INVENTOR.
Arthur E. Brown

Patented Oct. 5, 1954

2,690,869

UNITED STATES PATENT OFFICE 2,690,869

ROTARY MECHANISM FOR USE WITH FLUIDS

Arthur E. Brown, Scotia, N. Y.

Application September 2, 1950, Serial No. 182,931

6 Claims. (Cl. 230—150)

My invention relates to improvements in rotary mechanisms for use with fluids. It has application in compressors, expanders, internal combustion engines, etc. The objects of my improvements are; first, to secure more effective sealing cooperation among the rotors and the casing; second, to provide working surfaces which facilitate ease of construction; third, to provide means for compressing or expanding compressible fluids in a more efficient manner; fourth, to provide means whereby the time period in which the working fluid is confined by a line seal is small compared to the time in which the working fluid is confined by an area seal of the confining surfaces; fifth, to provide labyrinth seal grooves on the working or sealing surfaces for more effective sealing action; sixth, to provide an effective pressure responsive valve system for a rotary compressor; seventh, to provide a well balanced system; and eighth, to provide a system whereby the load on the pilot gears is small.

Other objects and advantages of the invention will be apparent during the course of the following description.

This application discloses improvements over the invention disclosed by me in a United States Patent application filed February 3, 1948, Serial No. 6,002, now Patent No. 2,559,590.

The accompanying drawings form a part of this specification and like numerals are employed to designate like parts throughout the same.

Figure I is a longitudinal sectional view of a rotary compressor having pressure responsive exhaust valves. The section is taken through the axes of both rotors and on the line I—I in Figure II.

Figure II is a transverse sectional view of the machine illustrated in Figure I. The section is taken perpendicular to the axes of the two rotors and on the line II—II in Figure I.

Figure III is a longitudinal sectional view of a rotary compressor or expander having a rotary valve. The section is taken through the axes of the two rotors and on the line III—III in Figure IV.

Figure IV is a transverse sectional view of the machine illustrated in Figure III. The section is taken perpendicular to the axes of the two rotors and on the line IV—IV in Figure III.

While I have shown only some preferred forms of my invention, I wish to have it understood that various modifications may be made within the scope of the claims hereto attached without departing from the spirit of the invention.

Refer to Figures I and II. A casing 1 with end cover plates 2 and 3 support and enclose the working parts. The shaft 4 is rotatably mounted in the casing on ball bearings 5 and 6. A rotary abutment wheel 7 is mounted on shaft 4. The shaft 8 is rotatably mounted in the casing on ball bearings 9 and 10. A circular flange 11 is integrally mounted on the shaft 8. A piston 12 is bolted rigidly to the flange 11. Shafts 4 and 8 are mounted with their axes parallel. Pilot gear 13 (with means for angular adjustment) and pilot gear 14 are rigidly mounted on shafts 4 and 8 and constrain the shafts to rotate together with equal angular velocity. A fixed hollow hub 15 (integral with the cover plate 2) is mounted concentric with the axis of shaft 8. The piston 12 rotates about the fixed hollow hub 15. A depression 16 is formed in the fixed hollow hub 15 and is curved in coincidence with the periphery of the abutment wheel 7. A plurality of radial valve ports 17 pass from the hollow portion 18 in the fixed hub 15 through the shell of the hub into the compression chamber 19. Each radial valve port 17 is covered with a spring plate valve 20. The spring plate valves 20 are curved and seat against the inner surface of the fixed hollow hub 15. The spring plate valves 20 are pressure responsive and permit gas to flow from the compression chamber 19 to the hollow portion 18 in the fixed hollow hub 15 but prevent flow in the reverse direction. A housing 21 is bolted to the end cover plate 2. A nonhomogeneous disk 22 is located in the housing 21 and is mounted rigidly on the shaft 8. The disk 22 is composed of a light and a dense material such as aluminum and the lead insert 64 (shown in dotted lines within the disk 22). The disk 22 is mounted so that the heavier lead insert portion 64 is located diametrically opposite the piston 12 so as to serve as a counterweight. In a like manner, the flange 11 is also nonhomogeneous and is provided with a heavy insert portion 65 (shown in dotted lines within the flange 11). The heavier portion 65 is located diametrically opposite the piston 12 so as to serve as a counterweight. An exhaust port 23 is provided in the housing 21. A gear cover 24 encloses the pilot gears. A driving connection 25 is provided on shaft 8. The abutment wheel 7 is hollow at 25 to balance the channel space 26. In operation, the piston 12 passes into and out of the channel space 26. Labyrinth seal grooves 27 are placed on the piston and at critical sealing places on the casing and fixed hollow hub. The labyrinth seal grooves increase considerably the sealing action of the parts. Passages 28 are provided for coolant. An inlet port 29 and a relief port 30 are provided in the casing. A cap with shaft seal 31 is provided on the end of the fixed hollow hub 15.

Operation of the compressor illustrated in Figures I and II is as follows: Shaft 8 is rotated at the driving connection 25 by a source of power not shown. Referring to Figure II, shaft 8 is rotated in a counterclockwise direction. Fluid is drawn in at the inlet port 29. The working fluid is propelled by the piston 12 and is compressed into the compression chamber 19. The pressure responsive valves 20 permit the working fluid in the compression chamber 19 to flow through ports 17 into the axial aperture 18 when the pressure in the compression chamber 19 begins to exceed the pressure of the working fluid in the axial aperture 18. The spring plate valve shown is unique in construction and application. The seat for the valve is formed by turning and finishing the inside of the hub 15 at the same time the outside of the hub is turned and finished. The spring plate valve shown, being of light weight, is adaptable to the high speed of operation necessary. It also requires little space, is simple, efficient, and is easily installed. The working fluid then flows through the axial aperture or hollow portion 18 of the fixed hollow hub to the outlet port 23. At the position shown, the edge 32 on the abutment wheel is in close proximity to the leading face of the piston. The edge 32 on the abutment wheel will next sweep across the leading face of the piston with close proximity and expel the working fluid from the compression chamber 19. It is that portion of the cycle that is referred to as the time period in which the working fluid is confined by a line seal. It is termed a line seal instead of an area seal because the edge 32 of the abutment wheel (which is line like in character) is required to retain the working fluid in the compression chamber 19. During the first part of the compression stroke, the working fluid is retained in the compression chamber 19 by close proximity of areas of surfaces of the parts rather than edges and hence that portion of the cycle is referred to as the time period in which the working fluid is confined by an area seal. Sealing action is much more effective with an area seal than it is with a line seal especially when labyrinth seal grooves are employed. It is therefore desirable to reduce the time period in which the working fluid is confined by a line seal and increase the time period in which the working fluid is confined by an area seal. This is accomplished by using a single piston (which is short in angular length) in cooperation with an abutment wheel. The abutment wheel is said to have negligible pumping effect because the abutment wheel itself does not serve to displace the working fluid so as to force the working fluid through the ports 17. The piston 12 does the actual pumping. The abutment wheel only forms an abutment so that the piston can force the working fluid through the ports 17. It is noted that a balanced system is provided even though a single piston is used. Very little power is transmitted by the pilot gears, because an abutment wheel is employed. At the position shown, the piston 12 is beginning to enter the channel space 26. As it does, working fluid is displaced out the relief port 30 which is provided for that purpose.

Refer to Figures III and IV which illustrate a mechanism which is similar to the mechanism illustrated in Figures I and II except that a shaft operated rotary valve is employed instead of pressure responsive spring plate valves. A casing 33 with end cover plates 34 and 35 support and enclose the working parts. The shaft 36 is rotatably mounted in the casing on ball bearings 37 and 38. A rotary abutment wheel 39 is mounted on shaft 36. The shaft 40 is rotatably mounted in the casing on ball bearings 41 and 42. A circular flange 43 is integrally mounted on the shaft 40. A piston 44 is bolted rigidly to the flange 43. Shafts 36 and 40 are mounted with their axes parallel. Pilot gear 45 (with means for angular adjustment) and pilot gear 46 are rigidly mounted on shafts 36 and 40 respectively and constrain the shafts to rotate together with equal angular velocity. A fixed hollow hub 47 (integral with the cover plate 34) is mounted concentric with the axis of shaft 40. The piston 44 rotates about the fixed hollow hub 47. A depression 48 is formed in the fixed hollow hub 47 and is curved in coincidence with the periphery of the abutment wheel 39. Two radial ports 49 pass from the hollow portion of the hub, through the shell of the hub, and into the chamber 50. A rotary sleeve valve operates inside of the fixed hollow hub 47. The said rotary sleeve valve is integrally fastened to the flange 43 and is composed of the sleeve 51 having two radial valve ports 52 in the sleeve. The ports 52 in the sleeve register with ports 49 in the fixed hollow hub in proper timed relation with rotation of the piston 44 and thus serve to control the flow of the working fluid. A housing 53 is bolted to the end cover plate 34. A non-homogeneous disk 54 is located in the housing 53 and is mounted rigidly on the shaft 40. The disk 54 is composed of a light and a dense material such as aluminum and the lead insert 66 (shown in dotted lines within the disk 54). The disk 54 is mounted so that the heavier lead insert portion 66 is located diametrically opposite the piston 44 so as to serve as a counterweight. In a like manner, the flange 43 is also non-homogeneous and is provided with a heavy insert portion 67 (shown in dotted lines within the flange 43). An exhaust or inlet port 55 is provided in the housing 53. A gear cover 56 encloses the pilot gears. A driving connection 57 is provided on shaft 40. The abutment wheel 39 is hollow at 58 to balance the channel space 59. Labyrinth seal grooves 60 are placed on the piston and at critical sealing places on the casing and fixed hollow hub. Passages 61 are provided for coolant. An inlet or exhaust port 62 and a relief port 63 are provided in the casing.

Operation of the mechanism illustrated in Figures III and IV is as follows: When operating as a compressor, the shaft 40 is rotated at the driving connection 57 by a source of power not shown. Referring to Figure IV, shaft 40 is rotated in a counterclockwise direction. Working fluid is drawn in at the port 62. The working fluid is propelled by the piston 44 and is compressed into the compression chamber 50. At the proper time, the ports 52 in the rotary sleeve valve overlap the ports 49 in the fixed hollow hub 47. Working fluid in the compression chamber 50 is then permitted to flow through the ports into the sleeve and thence to the port 55. It is thus seen that the rotary valve retains the working fluid in the compression chamber until it has been compressed to a certain degree before exposing it to the pressure of the working fluid previously compressed. Back flow of the working fluid previously compressed, with consequent throttling losses in efficiency, is avoided. When operating as an expander, working fluid is supplied under pressure to the port 55. When port 52 in the rotary valve sleeve overlaps port 49, working fluid under pressure is admitted to the chamber 50 which is sealed by the abutment wheel 39. Pressure of the working fluid acts upon the face of the piston 44 and motivates the piston in a clockwise direction. After the piston has advanced a predetermined amount, the ports 52 and 49 will no longer overlap and the supply of working fluid will be cut off and the working fluid in chamber 50 will be allowed to expand against the piston.

I claim:

1. The combination in a rotary mechanism for use with a working fluid of a casing; a rotary abutment wheel rotatably mounted in said casing; a coacting rotor rotatably mounted in said casing; said coacting rotor having a shaft, a flange rigidly attached to said shaft, and only one piston fastened to said flange; said coacting rotor being provided with a counterweight adapted to counterbalance the weight of said piston; said counterweight being located opposite said piston; pilot gears constraining said abutment wheel and said coacting rotor to rotate in proper timed relation; said abutment wheel being of circular form; said abutment wheel having a groove; said piston adapted to enter and recede from said groove during each rotation of the piston; means for balancing said abutment wheel about the axis of rotation of the abutment wheel; a hollow hub fixed to said casing; said piston being rotatable about said hollow hub; at least one radially directed port passing from the interior of said hollow hub through the shell of said hollow hub; the hollow portion of said hollow hub being adapted for passage of the working fluid; valve means for controlling the flow of the working fluid through said radially directed port; said casing having an inlet port and outlet port for passage of the working fluid; one of said ports being connected to the hollow portion of said hollow hub; an expansible working chamber; said expansible working chamber being inclosed by said abutment wheel, said casing, said piston, said hollow hub and said flange; said abutment wheel being adapted to serve as a rotary abutment for said piston; said abutment wheel having negligible pumping effect; said hollow hub having a depression in its outer surface; said depression having its surface concentric with the axis of said abutment wheel; the surface of said depression having a radius equal to the radius of the abutment wheel plus clearance; and the surface of said depression conforming closely to the peripheral surface of the abutment wheel so as to seal the working fluid in said expansible working chamber.

2. The combination recited in claim 1 wherein the said valve means includes a ported sleeve adapted to rotate inside said hollow hub, and wherein the port in said sleeve is adapted to register with the radially directed port in said hollow hub and thus serve as a rotary valve.

3. The combination recited in claim 1 wherein said valve means is a pressure responsive valve.

4. The combination recited in claim 1 wherein said valve means includes a pressure responsive spring plate valve and wherein said spring plate valve is curved to conform to the inner surface of said hollow hub.

5. The combination in a rotary mechanism for use with a working fluid of a casing; a pair of rotors rotatably mounted in said casing; at least one of said rotors having a shaft, a flange rigidly attached to said shaft, and a piston fastened to said flange; pilot gears constraining said rotors to rotate in proper timed relation; a hollow hub fixed to said casing; said piston being rotatable about said hollow hub; at least one radially directed port passing from the interior of said hollow hub through the shell of said hollow hub; the hollow portion of said hollow hub being adapted for passage of the working fluid; a pressure responsive spring plate valve for controlling the flow of the working fluid through said radially directed port; said spring plate valve being curved to conform to the inner surface of said hollow hub; said casing having an inlet port and an outlet port for passage of the working fluid; an expansible working chamber inclosed by said piston, said casing, said flange, said hollow hub, and the other rotor; said hollow hub having a depression in its outer surface; said depression having its surface concentric with the axis of the other rotor; the surface of said depression having a radius equal to the radius of the other rotor plus clearance; and the surface of said depression conforming closely to the peripheral surface of the other rotor so as to seal the working fluid in said expansible working chamber.

6. The combination in a rotary mechanism for use with a working gas of a casing; a pair of rotors rotatably mounted in said casing; at least one of said rotors having a shaft, a flange rigidly attached to said shaft, and a piston fastened to said flange; pilot gears constraining said rotors to rotate in proper timed relation; a hollow hub fixed to said casing; said piston being rotatable about said hollow hub; at least one radially directed port passing from the interior of said hollow hub through the shell of said hollow hub; the hollow portion of said hollow hub being adapted for passage of the working gas; valve means for controlling the flow of the working gas through said radially directed port; said casing having an inlet port and an outlet port for passage of the working gas; an expansible working chamber inclosed by said casing, said piston, said flange, said hollow hub, and the other rotor; said hollow hub having a depression in its outer surface; said depression having its surface concentric with the axis of the other rotor; the surface of said depression having a radius equal to the radius of the other rotor plus clearance; the surface of said depression conforming closely to the peripheral surface of the other rotor so as to seal the working gas in said expansible working chamber; labyrinth seal grooves located on the surface of said depression; labyrinth seal grooves located on said piston; and said labyrinth seal grooves serving to reduce the leakage of the working gas out of said expansible working chamber.

References Cited in the file of this patent

UNITED STATES PATENTS

| Number | Name | Date |
|---|---|---|
| 179,836 | Allan | July 18, 1876 |
| 710,756 | Colbourne | Oct. 7, 1902 |
| 883,894 | Knowles | Apr. 7, 1908 |
| 906,684 | Bower et al. | Dec. 15, 1908 |
| 1,027,091 | Weddington | May 21, 1912 |
| 1,231,640 | O'Connor | July 3, 1917 |
| 1,257,744 | Schorr | Feb. 26, 1918 |
| 1,368,869 | Whiting | Feb. 15, 1921 |
| 1,636,486 | Planche | July 19, 1927 |
| 1,751,843 | Rosett | Mar. 25, 1930 |
| 1,890,574 | Dubrovin | Dec. 13, 1932 |
| 1,899,904 | Sleeper et al. | Feb. 28, 1933 |
| 1,901,417 | Sleeper | Mar. 14, 1933 |
| 2,018,515 | Doeg | Oct. 22, 1935 |

FOREIGN PATENTS

| Number | Country | Date |
|---|---|---|
| 19,032/34 | Australia | Nov. 25, 1935 |
| 28,652 | Netherlands | Nov. 16, 1932 |
| 55,885 | Sweden | Jan. 15, 1924 |
| 359,691 | Great Britain | Oct. 29, 1931 |
| 627,202 | France | May 30, 1927 |